United States Patent [19]

Dean

[11] Patent Number: 4,978,200
[45] Date of Patent: Dec. 18, 1990

[54] OPTICAL IMAGE ROTATORS

[75] Inventor: Terence F. Dean, Ruislip, England

[73] Assignee: Thorn EMI plc, London, England

[21] Appl. No.: 250,169

[22] Filed: Sep. 28, 1988

[30] Foreign Application Priority Data

Oct. 2, 1987 [GB] United Kingdom ............. 8723209

[51] Int. Cl.$^5$ .................. G02B 7/18; G02B 27/64
[52] U.S. Cl. .................................. 350/287; 350/500
[58] Field of Search .............. 350/287, 500, 539, 571, 350/6.9, 6.91, 286

[56] References Cited

U.S. PATENT DOCUMENTS

| | | | |
|---|---|---|---|
| 3,724,927 | 4/1973 | Cox | 350/286 |
| 4,013,339 | 3/1977 | Ando et al. | 350/500 |
| 4,235,506 | 11/1980 | Saito et al. | 350/500 |
| 4,370,540 | 1/1983 | Davis et al. | 219/121.85 |
| 4,381,884 | 5/1983 | Houle | 350/287 |
| 4,722,592 | 2/1988 | Stolfi | 350/287 |

FOREIGN PATENT DOCUMENTS

| | | |
|---|---|---|
| 629875 | 10/1961 | Canada ................. 350/287 |
| 263656 | 4/1988 | European Pat. Off. . |
| 307095 | 3/1989 | European Pat. Off. . |
| 3213149 | 12/1982 | Fed. Rep. of Germany . |

OTHER PUBLICATIONS

"Image Rotation Devices-A Comparative Survey," by D. W. Swift, Optics and Laser Technology, Aug. 1972, pp. 175–188.

Primary Examiner—Bruce Y. Arnold
Assistant Examiner—Ronald M. Kachmarik
Attorney, Agent, or Firm—Fleit, Jacobson, Cohn, Price, Holman and Stern

[57] ABSTRACT

An optical image rotator assembly has both a rotational axis and an optical axis. Provision is made for adjusting the alignment of the optical axis, both angularly and translationally, in relation to the rotational axis.

5 Claims, 2 Drawing Sheets

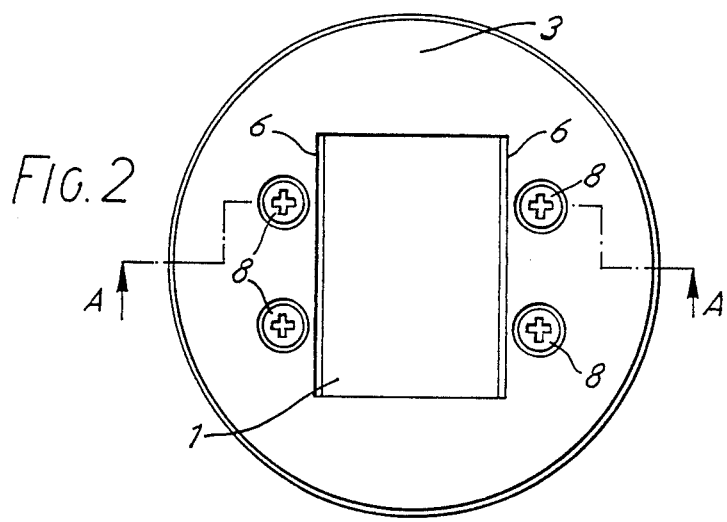
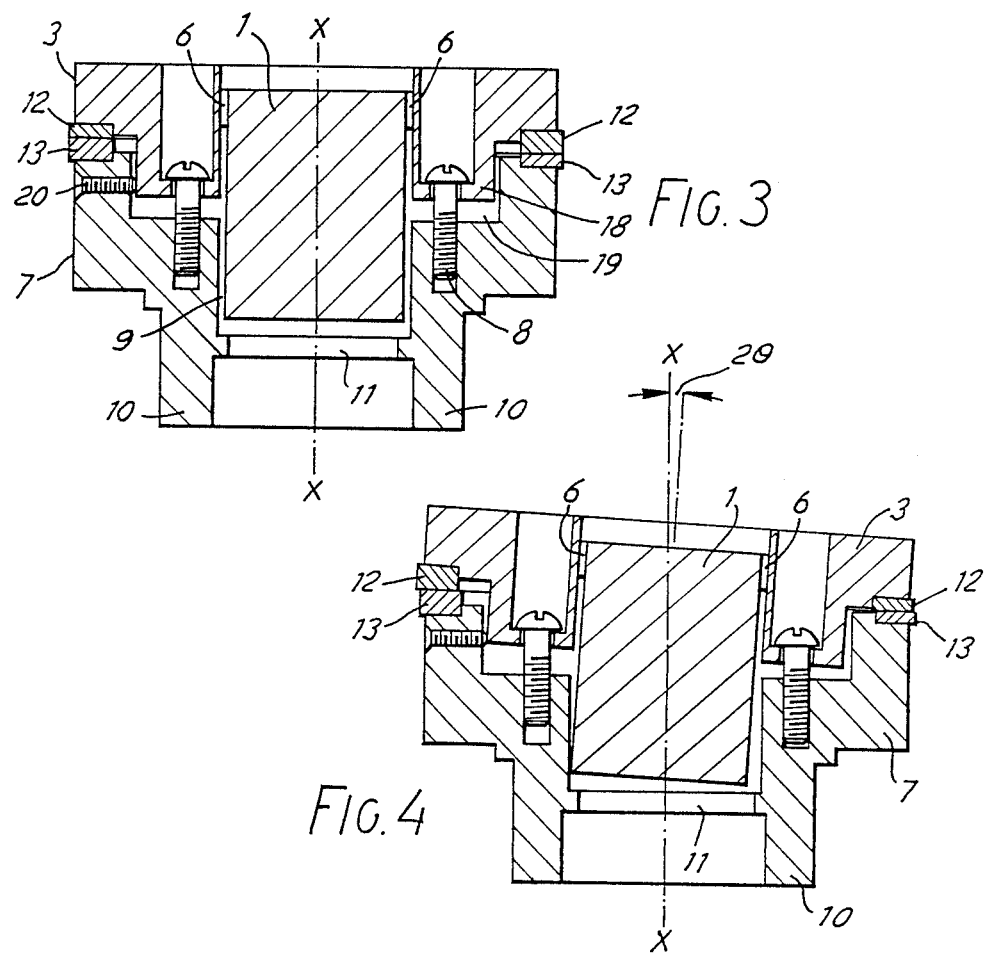

OPTICAL IMAGE ROTATORS

The present invention is related to optical image rotators and particularly, but not exclusively, to those suitable for use with multi-channel optical recording systems.

Optical rotation devices to produce a rotation of an image about an optical axis are well known and are described, for example, in the published paper "Image rotation devices—a comparative survey", Optics and Laser Technology, Aug. 1972, page 175. The use of such rotators in multi-channel helical scan optical tape recording systems is described in our pending European Patent Application Nos. 0263656 and 0307095, and a particularly suitable form of optical rotator for use in such systems is a modified form of Pechan rotator disclosed in our pending European Patent Application No. 0307094. It is important when using such rotators that the optical axis of the rotator is precisely aligned to the axis of rotation of the system when the rotator is first assembled and that such alignment is maintained during normal usage, which may include rotation at speeds of several hundred revolutions per second and operation under adverse environmental conditions of acceleration and vibration. It is feasible to manufacture each of the component parts of an optical rotator assembly with sufficiently high mechanical precision to ensure that such alignment is maintained without the provision of any means of adjustment, but the cost of such manufacture is likely to be unacceptably high when mass production is required.

The present invention provides an image rotator assembly with means for readily adjusting, both angularly and translationally, the alignment of its optical axis in relation to its rotational axis.

Thus, according to the present invention, there is provided an optical image rotator assembly comprising:
  an optical rotator for the rotative processing of light passing therethrough and having a mounting member,
  a housing member for the assembly,
  one of the said members defining the optical axis of the assembly and the other of the said members defining the rotational axis of the assembly,
  the mounting member and the housing member being engageable in a first position in which the optical axis and the rotational axis are aligned,
  and means to alter the separation of the members from that in the first position in order to provide at least one alternative position of the members in which the axes are not aligned.

Preferably, the alteration means comprises a ring of differing thickness over the circumference, for engagement with either a second ring of differing thickness over the circumference or an appropriately inclined suface on one of the members.

Preferably, the optical image rotator comprises a prism; alternatively the optical rotator comprises a number of suitably-mounted light-reflective surfaces.

In the image rotator assembly, the alignment of the optical axis to the rotational axis, once adjusted, is securable to inhibit disturbance by high rotational speeds or by adverse environmental conditions due to accelerations or vibrations.

An image rotator embodying the present invention has a facility for adjustment whereby the optical and rotational axes may be readily aligned during assembly, the use of comparatively wide dimensional tolerances for the component parts thereby being possible. Accordingly, the component parts of the image rotator assembly may be manufactured at low cost using mass production methods.

The invention will now be described, by way of example only, with reference to the accompanying drawings, in which:

FIG. 2 is a plan view of the image rotator assembly;

FIG. 3 is a side sectional view of the image rotator assembly in a first condition of adjustment, viewed along the line AA of FIG. 2;

FIG. 4 is a side sectional view of the image rotator assembly in a second condition of adjustment, viewed along the line AA of FIG. 2.

Figure 1:
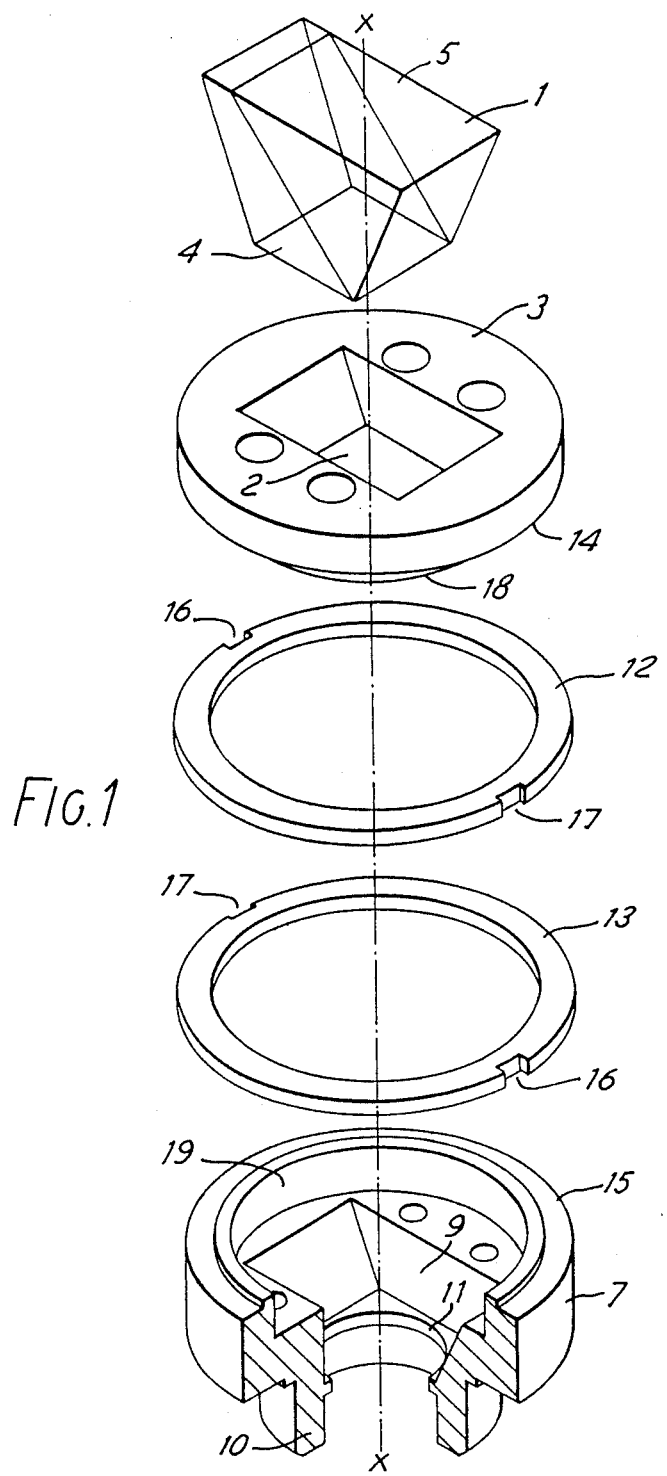
FIG. 1 is an exploded diagram showing the component parts of an image rotator assembly.

The image rotator assembly shown in FIGS. 1 to 4 is suitable for use in a multiple beam helical scan optical tape recording system and may be mounted co-axially with a helical scanning drum as is described in our pending European Patent Application No. 0307095. In such systems a Pechan prism is rigidly fixed to a vertical downwardly extending hollow drive shaft through which incident light, in the form of a plurality of laser beams, is directed. The entry and exit surfaces of the Pechan prism are accurately parallel, and if periodic displacement of the rotated image corresponding to the incident laser beams is to be avoided, the axis of rotation of the prism must lie precisely perpendicular to the entry and exit faces and parallel to the entrant laser beams. Furthermore, in order that unwanted periodic mechanical disturbances should be avoided, it is desirable that the axis of rotation passes through the centre of gravity of the rotating assembly.

FIGS. 1 to 4 show a Pechan prism 1 which loosely fits into a complementarily shaped orifice provided in a substantially disc shaped prism mounting member 3 such that the entry and exit faces, 4, 5, respectively of the prism lie substantially parallel to the upper surface of the mounting member 3, the exit face 5 of the prism is slightly recessed below the upper surface of the member 3 and the lower region of the prism protrudes downwardly below the lower surface of the member 3. The prism is firmly fixed to the member 3 by means of a resin adhesive 6 between the side faces of the prism and the associated side faces of the orifice 2. The member 3 is fixed to a housing 7 by means of four fixing screws 8. The lower region of the prism extends downwardly to loosely fit into a recess 9 provided in the housing. The housing is provided with an intregral downwardly extending tubular portion which, in use, is fixed to the hollow drive shaft (not shown) provided for rotation about the axis XX. A circular aperture 11 beneath the lower face of the prism permits the entry of light in a direction parallel to the axis XX. A pair of identical tapered adjusting rings 12, 13, are clamped between facing peripheral recessed annular surfaces 14, 15, in the mounting member 3 and the housing 7 respectively. The opposite faces of each adjusting ring are tapered relative to one another by an angle O, typically on the order of 1°. During assembly, the mounting member 3, with the Pechan prism bonded to it, is loosely fitted to the housing 7 with the two adjusting rings in position and the four fixing screws 8 are lightly tightened such that the adjusting rings are lightly held together by readily rotatable relative to the housing and the mounting member and to one another. Each ring is provided with two diammetrically opposed notches 16, 17 in its outer periphery in order that a small tool may be readily used to provide the rotation. Conveniently, the notches are differently sized and disposed closely adjacent to respective thickest and thinnest regions of each ring for identification purposes. FIG. 3 shows an idealised assembly in which the Pechan prism has its entry and exit faces lying perpendicular to the rotational axis XX and with the two adjusting rings in complementary positions such that they have a constant overall thickness. Rotation of one ring relative to the other will cause an angular displacement of the prism up to a maximum of 2 O, as is shown in FIG. 4. It is thus possible, by rotation of one ring relative to the other, to correct for any angular misalignments of the optical axis of the prism to the axis of rotation which may be caused by inaccuracies in prism alignment to the member 3 or by unfavourable dimensional tolerances of the mating component parts. Furthermore, such correction may be applied in any radial direction by suitable rotating both adjusting rings together relative to the housing and the member 3. The fixing screws 8 pass through clearance holes in counterbores in the member 3 with sufficient clearance to permit lateral movement of the prism relative to the housing. The lower surface of the mounting member 3 has a cylindrical protusion which loosely fits into a cylindrical recess 19 provided in the upper surface of the housing, and lateral adjustment of the prism relative to the housing may be controlled by means of grub screws 20 suitably positioned around the periphery of the housing without altering tha angular alignment. Thus, while the fixing screws 8 are lightly tightened, rotation of the two adjusting rings and adjustment of grub screws can provide correction for angular and lateral inaccuracies in prism position relative to the rotational axis of the housing and, following such correction, the four fixing screws may be fully tightened to rigidly fix the prism in position. It will be apparent to those skilled in the art that the use of loosely fitting component parts, combined with such adjustment, permits such parts to be produced in quantity by low cost manufacturing methods, and the mounting member and housing may each suitably be formed by, for example, plastics moulding or metal die casting methods. Furthermore, the provision of such adjustments eliminates any necessity for precisely aligning the prism to the mounting plate when bonding these components to one another.

A suitable alignment rig, making use of mechanical and optical techniques well known to those skilled in the art, may be provided for carrying out the necessary angular and lateral adjustments. Such adjustments are preferably carried out after the hollow drive shaft has been fixed to the housing, thereby enabling compensation for any mis-alignment of the housing relative to the drive shaft. Alternatively, the drive shaft and the housing may initially be formed as one unitary member.

Alternative embodiments of the invention will be apparent to those skilled in the art, and use of the invention is not limited to optical recording devices.

The embodiments of the invention in which an exclusive property or privilege is claimed are defined as follows:

1. An optical image rotator assembly comprising:
   an optical rotator for the rotative processing of light passing therethrough and having a mounting member, a housing member for the assembly, one of the said members defining the optical axis of the assembly and the other of the said members defining the rotational axis of the assembly, the mounting member and the housing member being engagable in a first position in which the optical axis and the rotational axis are aligned, and alteration means to alter the alignment from that in the first position in order to provide at least one alternative position of the members in which tha axes are not aligned, said alteration means comprising a ring of differing thickness over the circumference for engagement with a second ring of differing thickness over the circumference.

2. An optical image rotator assembly according to claim 1 wherein said assembly comprises a prism.

3. An optical image rotator assembly according to claim 1 wherein said assembly comprises a number of light-reflective surfaces.

4. An optical image rotator assembly according to claim 1 wherein the alignment of the optical axis to the rotational axis, once adjusted, is securable to inhibit disturbace by high rotational speeds or by adverse environmental conditions due to accelerations of vibrations.

5. An optical image rotator according to claim 1 having adjustment means whereby the optical and rotational axes may be readily aligned during assembly of the rotator.

* * * * *